United States Patent
Hendriks et al.

(10) Patent No.: US 7,602,691 B2
(45) Date of Patent: Oct. 13, 2009

(54) DIFFRACTIVE PART

(75) Inventors: Bernardus Hendrikus Wilhelmus Hendriks, Eindhoven (NL); Teunis Willem Tukker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 426 days.

(21) Appl. No.: 11/572,603

(22) PCT Filed: Jul. 21, 2005

(86) PCT No.: PCT/IB2005/052460

§ 371 (c)(1),
(2), (4) Date: Jan. 24, 2007

(87) PCT Pub. No.: WO2006/013526

PCT Pub. Date: Feb. 9, 2006

(65) Prior Publication Data

US 2008/0095015 A1 Apr. 24, 2008

(30) Foreign Application Priority Data

Jul. 27, 2004 (EP) .................................. 04300480

(51) Int. Cl.
*G11B 7/00* (2006.01)
(52) U.S. Cl. ............................ 369/112.04; 369/112.03; 369/44.28; 369/44.37
(58) Field of Classification Search ........................ None
See application file for complete search history.

(56) References Cited

U.S. PATENT DOCUMENTS 5,966,364 A 10/1999 Kamatani (Continued)

FOREIGN PATENT DOCUMENTS

CN 1430219 A 7/2003

(Continued)

OTHER PUBLICATIONS

E Verstegen, et al: Photo Replication of Birefringent Phase Structures, Journal of Applied Physics, vol. 43, No. 7B, Jul. 2004, pp. 4772-4776.

(Continued)

*Primary Examiner*—Muhammad N. Edun (57) ABSTRACT

A diffractive part for an optical scanning device is described. The device is for scanning a first information layer by means of a first radiation beam having a first wavelength and a first polarisation, a second information layer by means of a second radiation beam having a second wavelength and a second polarisation, and a third information layer by means of a third radiation beam having a third wavelength and a third polarisation. The first, second and third wavelengths differ from each other. The device includes a radiation source for supplying the first, second and third radiation beams, an objective lens system for converging the radiation beams on the respective information layer, and a diffractive part arranged in the optical path of the radiation beams. The diffractive part includes a first diffractive grating structure having a series of steps of predetermined height to introduce a phase change that is an integral multiple of $2\pi E$ for both the second and third wavelengths but not the first wavelength, and a second diffractive grating structure having a series of steps of predetermined height to introduce a phase change that is an integral multiple of $2\pi$ for the first and third wavelengths but not the second wavelength.

13 Claims, 6 Drawing Sheets

U.S. PATENT DOCUMENTS

| | | |
|---|---|---|
| 6,304,541 B1 | 10/2001 | Chang et al. |
| 7,433,290 B2 * | 10/2008 | Komma ................. 369/112.08 |
| 7,522,508 B2 * | 4/2009 | Nishioka et al. ....... 369/112.05 |
| 2002/0051247 A1 | 5/2002 | Jutte et al. |
| 2002/0196726 A1 | 12/2002 | Takeda |
| 2003/0039033 A1 | 2/2003 | Takeuchi et al. |
| 2003/0064295 A1 | 4/2003 | Yasuyuki et al. |
| 2003/0179680 A1 | 9/2003 | Park et al. |
| 2005/0083562 A1 | 4/2005 | Hendriks |

FOREIGN PATENT DOCUMENTS

| | | |
|---|---|---|
| EP | 0789355 A1 | 8/1997 |
| EP | 0789355 B1 | 8/1997 |
| JP | 2001209966 A1 | 8/2001 |
| WO | 03056550 A2 | 7/2003 |
| WO | 03060891 A2 | 7/2003 |

OTHER PUBLICATIONS

G. Bouwhuis, et al: Principles of Optical Disc Systems, Adam Hilger, 1985, ISBN 085274-785-3, pp. 75-80.

* cited by examiner

DIFFRACTIVE PART

FIELD OF THE INVENTION

The present invention relates to a diffractive part for an optical scanning device, to optical scanning devices incorporating such diffractive parts, and to methods of manufacture of such parts and such devices. Embodiments of the present invention are particularly suitable for use in optical scanning devices compatible with three different formats of optical record carrier, such as compact discs (CDs), conventional digital versatile discs (DVDs) also called "Red DVD" and so-called next generation DVDs, such as Blu-ray Disc (BD).

BACKGROUND OF THE INVENTION

Optical record carriers exist in a variety of different formats, with each format generally being designed to be scanned by a radiation beam of a particular wavelength. For example, CDs are available, inter alia, as CD-A (CD-audio), CD-ROM (CD-read only memory) and CD-R (CD-recordable), and are designed to be scanned by means of a radiation beam having a wavelength ($\lambda$) of around 785 nm. Red-DVDs, on the other hand, are designed to be scanned by means of a radiation beam having a wavelength of about 650 nm, and Blu-ray Discs are designed to be scanned by means of a radiation beam having a wavelength of about 405 nm. Generally, the shorter the wavelength, the greater the corresponding capacity of the optical disc e.g. a Blu-ray Disc-format disc has a greater storage capacity than a Red DVD-format disc.

It is desirable for an optical scanning device to be compatible with different formats of optical record carriers, e.g. for scanning optical record carriers of different formats responding to radiation beams having different wavelengths whilst preferably using one objective lens system. For instance, when a new optical record carrier with higher storage capacity is introduced, it is desirable for the corresponding new optical scanning device used to read and/or write information to the new optical record carrier to be backward compatible i.e. to be able to scan optical record carriers having existing formats.

Unfortunately, optical discs designed for being read out at a certain wavelength are not always readable at another wavelength. For example, in a CD-R-format disc, special dyes have to be applied in the recording stack in order to obtain a high modulation of the scanning beam at $\lambda=785$ nm. At $\lambda=660$ nm, the modulation signal from the disc becomes so small (due to the wavelength sensitivity of the dye) that readout at this wavelength is not feasible. Further, there can be a difference in thickness of the transparent cover layers for discs of different formats, which can lead to the undesirable generation of spherical aberration.

A number of solutions have been proposed for the design of an optical scanning device capable of generating predefined wavefronts for the different wavelengths associated with each format.

For instance, Japanese patent application JP-A-2001209966 describes an optical scanning device for scanning optical discs at three different wavelengths. The device comprises an optical axis coupling element for ensuring that the three beams of different wavelength travel along a common optical axis, and a condenser lens for condensing the three different beams onto the information layer of an optical record carrier. The described device has a diffractive part arranged along the common optical axis.

The diffractive part includes a diffraction grating that is rotationally symmetric about the optical axis. The diffractive part has two parallel planes, between which a first layer made of glass and a second layer of birefringent material are provided. The interface between the first and second layers is a pattern of diffractive elements having a single stepped profile, that is rotationally symmetric about the optical axis. The first and second layers are chosen such that the diffractive part forms a first diffracted radiation beam of the zeroth order for a first wavelength, and a diffractive radiation beam of a higher order for the second and third wavelengths. JP-A-2001209966 teaches the use of a solid birefringent material having an ordinary refractive index and an extraordinary refractive index, one of which is the refractive index of the first (glass) layer. The zeroth order beam can be formed by ensuring that the polarisation of the incident wavelength is aligned with the refractive index of the second layer equal to the refractive index of the first layer. In other words, the diffractive part then acts as a transparent parallel plate to the first wavelength.

International Patent Application No. PCT/IB02/05624 in the name of Philips also describes an optical scanning device for scanning three information layers with three respective radiation beams. Each beam has a respective wavelength and polarisation. The three wavelengths differ from each other. At least one of the three polarisations differs from the others. The device comprises a diffractive part including a pattern of elements which have one stepped profile for forming three diffracted beams from three radiation beams, with the part comprising a birefringent material, sensitive to the three polarisations. The stepped profile of the diffractive part is rotationally symmetric about the optical axis. The stepped profile is designed such that the heights of the steps of a pattern element introduce phase changes that equal at least two different multiples of $2\pi$ for one of the three wavelengths, and equal at least two different phase changes modulo $2\pi$ for at least one of the two other wavelengths.

SUMMARY OF THE INVENTION

It is an aim of embodiments of the present invention to provide an optical scanning device suitable for scanning optical record carriers by means of radiation beams having three different wavelengths, the device being an alternative to the known solutions.

According to a first aspect, the present invention provides an optical scanning device for scanning a first information layer by means of a first radiation beam having a first wavelength and a first polarisation, a second information layer by means of a second radiation beam having a second wavelength and a second polarisation, and a third information layer by means of a third radiation beam having a third wavelength and a third polarisation, wherein said first, second and third wavelengths differ from each other, the device comprising a radiation source for supplying said first, second and third radiation beams; an objective lens system for converging said radiation beams on the respective information layer; and a diffractive part arranged in the optical path of said radiation beams, the diffractive part comprising a first diffractive grating structure comprising a series of steps of predetermined height to introduce a phase change that is an integral multiple of $2\pi$ for both said second and third wavelengths but not for said first wavelength; and a second diffractive grating structure comprising a series of steps of predetermined height to introduce a phase change that is an integral multiple of $2\pi$ for said first and third wavelengths but not for said second wavelength.

The optical scanning device has two grating structures. The first structure acts as a diffractive grating for the first wavelength, and the second structure acts as a diffractive grating for the second wavelength. This allows the selection of different diffraction orders for more than two different wavelengths. The diffractive part allows the use of grating structures having different pitches for different wavelengths. Further, the grating structures can have different orientations.

Preferably, the steps of said second diffractive grating structure have a different pitch from the steps of said first diffractive grating structure.

Preferably, said first diffractive grating structure is orientated at a first predetermined angle relative to an optical axis of said objective lens system, and the second diffractive grating structure is orientated at a second, different predetermined angle relative to said optical axis.

Preferably, said diffractive part comprises a superposition of the steps of said first and second diffractive grating structures.

Preferably, said first grating structure is arranged to diffract the first radiation beam to produce a three-spot beam of said first wavelength, and said second diffractive grating structure is arranged to diffract said second wavelength so as to produce a three-spot beam of said second wavelength.

Preferably, said first diffractive grating structure is formed from a birefringent material.

Preferably, said second diffractive grating structure is formed from a non-birefringent material.

Preferably, at least one of said series of steps is a series of steps of equal width per period.

Preferably, at least one of said first, second and third polarisations differs from the others.

According to a second aspect, the present invention provides a diffractive part for use in an optical device utilising a first radiation beam having a first wavelength and a first polarisation, a second radiation beam having a second wavelength and a second polarisation, and a third radiation beam having a third wavelength and a third polarisation, wherein said first, second and third wavelengths differ from each other, the diffractive part comprising:

a first diffractive grating structure comprising a series of steps of predetermined height to introduce a phase change that is an integral multiple of $2\pi$ for both said second and third wavelengths but not for said first wavelength; and a second diffractive grating structure comprising a series of steps of predetermined height to introduce a phase change that is an integral multiple of $2\pi$ for said first and third wavelengths but not for said second wavelength.

Preferably, said first diffractive grating structure extends substantially in a first plane, said second diffractive grating structure extends substantially in a second plane, and said first plane is not parallel to said second plane.

According to a third aspect, the present invention provides a method of manufacturing an optical scanning device for scanning a first information layer by means of a first radiation beam having a first wavelength and a first polarisation, a second information layer by means of a second radiation beam having a second wavelength and a second polarisation, and a third information layer by means of a third radiation beam having a third wavelength and a third polarisation, wherein said first, second and third wavelength substantially differ from each other, the method comprising: providing a radiation source for supplying said first, second and third radiation beams; providing an objective lens system for converging said radiation beams on the respective information layer; and providing a diffractive part arranged in the optical path of said radiation beams, the diffractive part comprising: a first diffractive grating structure comprising a series of steps of predetermined height to introduce a phase change that is an integral multiple of $2\pi$ for both said second and third wavelengths but not for said first wavelength; and a second diffractive grating structure comprising a series of steps of predetermined height to introduce a phase change that is an integral multiple of $2\pi$ for said first and third wavelengths but not for said second wavelength.

According to a fourth aspect, the present invention provides a method of manufacturing a diffractive part for use in an optical device utilising a first radiation beam having a first wavelength and a first polarisation, a second radiation beam having a second wavelength and a second polarisation, and a third radiation beam having a third wavelength a third polarisation, wherein said first, second and third wavelengths differ from each other, the method comprising: providing a first diffractive grating structure comprising a series of steps of predetermined height to introduce a phase change that is an integral multiple of $2\pi$ for both said second and third wavelengths but not for said first wavelength; and providing a second diffractive grating structure comprising a series of steps of predetermined height to introduce a phase change that is an integral multiple of $2\pi$ for said first and third wavelengths but not for said second wavelength.

BRIEF DESCRIPTION OF THE DRAWINGS

The invention will now be described in more detail by way of example with reference to the accompanying drawings, in which.

DETAILED DESCRIPTION OF THE INVENTION

The present invention relates to utilising a diffractive part having a first diffractive grating structure and a second diffractive grating structure. The diffractive part is for use in conjunction with three different wavelength radiation beams, each beam being polarised, with preferably at least one of the polarisations of one of the beams differing from the others.

The first diffractive grating structure comprises a series of steps that are multiple integers of a first step height. The first step height produces a phase step of an integer multiple of $2\pi$ for the second and third wavelengths (but not the first wavelength). The second diffractive grating structure is built up of steps that are multiple integers of a second step height, arranged to produce a phase step of an integer multiple of $2\pi$ for the first and third wavelengths, but not the second wavelength. Thus, the first diffractive grating structure is effectively invisible (i.e. it does not substantially diffract) the second and third wavelengths, whilst the second diffractive grating structure is effectively invisible to the first and third wavelengths. The first diffractive grating structure thus acts as a diffractive grating for the first wavelength, and the second diffractive grating structure acts as a diffractive grating for the second wavelength, with both grating structures being invisible on the third wavelength. Preferably, the diffractive part is a binary grating, with the grating being built up by a superposition of the first diffractive grating structure and the second diffracting grating structure. Alternatively, the first diffracting grating structure can be formed as a separate layer to the second diffractive grating structure.

Many optical scanning devices use a three-beam method of tracking. The radiation beam is divided into three beams (also termed a three spot beam), the central one of which scans the information layer of the optical disc, whilst the other two are used to provide position information. Different optical formats may require the spots incident on the information layer to be spaced a different distance apart. The present inventors have realised that by using a diffractive part essentially comprising two different diffractive grating structures, then each diffractive grating structure can be arranged to provide the desired spot separation for a predetermined format. Further, by careful selection of the steps forming each grating structure, the grating structures can be arranged to pass the radiation beams of other formats without substantial diffraction.

Figure 1:
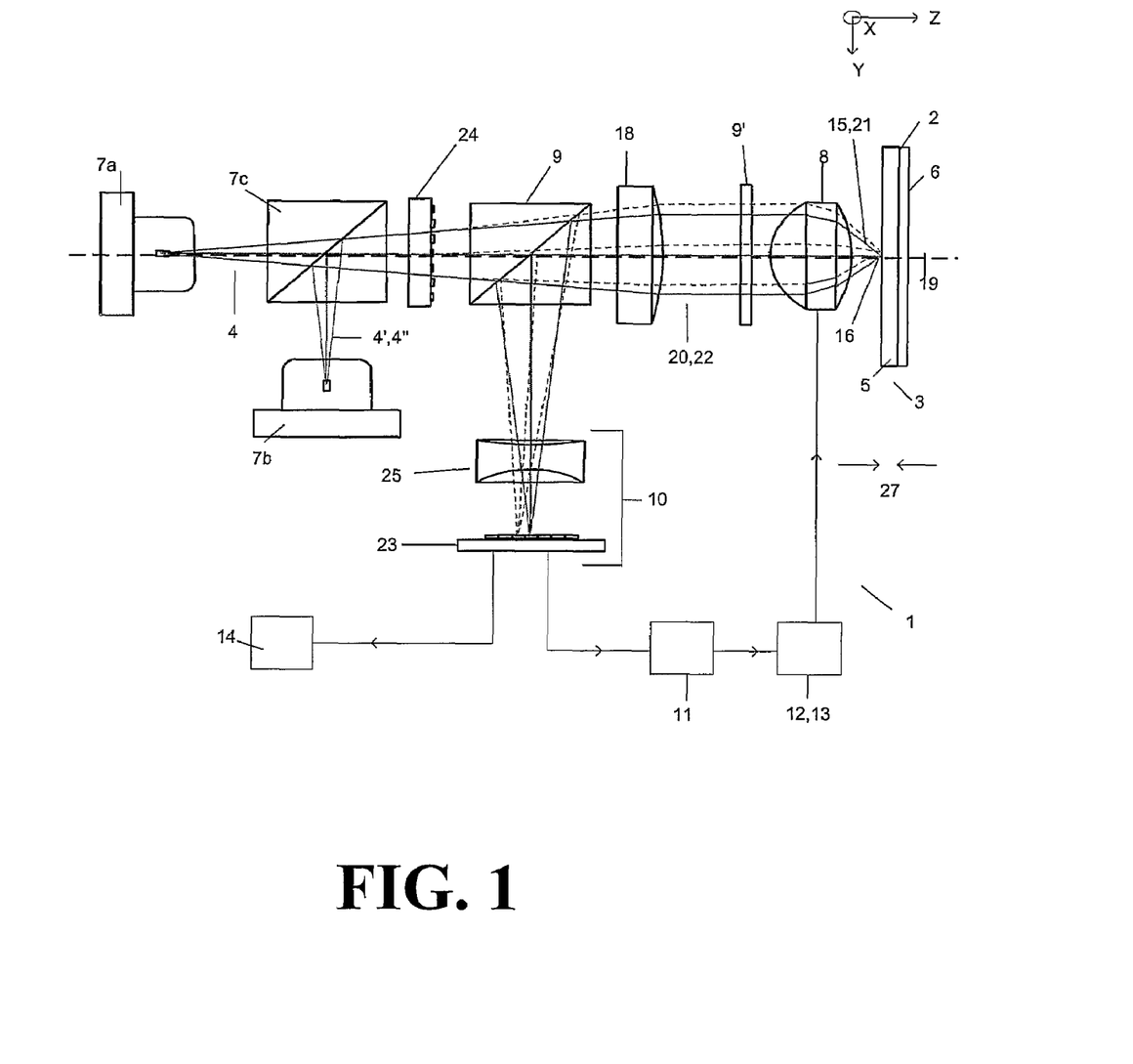
FIG. 1 is a schematic diagram of an optical scanning device according to an embodiment of the present invention.

FIG. 1 shows a device 1 for scanning a first information layer 2 of a first optical record carrier 3 by means of a first radiation beam 4, the device including such a diffractive part 24.

The optical record carrier 3 comprises a transparent layer 5, on one side of which information layer 2 is arranged. The side of the information layer 2 facing away from the transparent layer 5 is protected from environmental influences by a protective layer 6. The side of the transparent layer facing the device is called the entrance face. The transparent layer 5 acts as a substrate for the optical record carrier 3 by providing mechanical support for the information layer 2. Alternatively, the transparent layer 5 may have the sole function of protecting the information layer, while the mechanical support is provided by a layer on the other side of the information layer 2, for instance by the protective layer 6 or by an additional information layer and transparent layer connected to the uppermost information layer. It is noted that the information layer has first information layer depth 27 that corresponds, in this embodiment as shown in FIG. 1, to the thickness of the transparent layer 5. The information layer 2 is a surface of the carrier 3.

Information may be stored in the information layer 2 of the record carrier in the form of optically detectable marks arranged in substantially parallel, concentric or spiral tracks, not indicated in the figure. A track is a path that may be followed by the spot of a focused radiation beam. The marks may be in any optically readable form, e.g. in the form of pits, or areas with a reflection coefficient, or a direction of magnetisation different from the surroundings, or a combination of these forms. In the case where the optical record carrier 3 has the shape of a disc, the following is defined with respect to a given track: the "radial direction" is the direction of a reference axis, the X-axis, between the track and the centre of the disc, and the "tangential direction" is the direction of the Y-axis, that is tangential to the track and perpendicular to the X-axis.

As shown in FIG. 1, the optical scanning device 1 includes a radiation source 7 (illustrated as two separate sources 7a, 7b), a collimator lens 18, a beam splitter 9, an objective lens system 8 having an optical axis 19, a diffractive part 24, and a detection system 10. Furthermore, the optical scanning device 1 includes a servo circuit 11, a focus actuator 12, a radial actuator 13, and an information processing unit 14 for error correction.

In the following "Z-axis" corresponds to the optical axis 19 of the objective lens system 8. It is noted that (X,Y,Z) is an orthogonal base.

The radiation source 7 is arranged for consecutively or simultaneously supplying a first radiation beam 4, a second radiation beam 4' and a third radiation beam 4". For example, the radiation source 7 may comprise a tunable semiconductor laser for consecutively supplying the radiation beams 4, 4' and 4", or three semiconductor lasers for simultaneously supplying these radiation beams. In the example shown, the radiation source 7 is in the form of two separate lasers 7a, 7b. The first laser 7a is arranged to supply the first radiation beam 4. The second laser 7b is a dual wavelength laser, arranged to supply both of the second and third radiation beams 4', 4". The beam splitter 7c is arranged to combine the paths of the radiation beams 4, 4' and 4", such that the radiation beams are transmitted substantially along the optical axis 19.

The radiation beam 4 has a wavelength $\lambda_1$ and a polarisation $p_1$, the radiation beam 4' has a wavelength $\lambda_2$ and a polarisation $p_2$, and the radiation beam 4" has a wavelength $\lambda_3$ and a polarisation $p_3$. The wavelengths $\lambda_1$, $\lambda_2$, and $\lambda_3$ are all different. Preferably, the difference between any two wavelengths is equal to, or higher than, 20 nm, and more preferably 50 nm. At least two of the polarisations $p_1$, $p_2$, and $p_3$ differ from each other. Examples of the wavelengths $\lambda_1$, $\lambda_2$, and $\lambda_3$ and the polarisations $p_1$, $p_2$, and $p_3$ will be given below.

The collimator lens 18 is arranged on the optical axis 19 for transforming the radiation beam 4 into a substantially collimated beam 20. Similarly, it transforms the radiation beams 4' and 4" into two respective substantially collimated beams 20' and 20" (not shown in FIG. 1).

The beam splitter 9 is arranged for transmitting the radiation beams towards the objective lens system 8. Preferably, the beam splitter 9 is formed with a plane parallel plate that is tilted at an angle $\alpha$ with respect to the Z-axis, and more preferably $\alpha = 45°$.

The objective lens system 8 is arranged for transforming the collimated radiation beam 20 to a first focused radiation beam 15 so as to form a first scanning spot 16 in the position of the information layer 2.

During scanning, the record carrier 3 rotates on a spindle (not shown in FIG. 1), and the information layer 2 is then scanned through the transparent layer 5. The focused radiation beam 15 reflects on the information layer 2, thereby forming a reflected beam 21 which returns on the optical path of the forward converging beam 15. The objective lens system 8 transforms the reflected radiation beam 21 to a reflected collimated radiation beam 22. The beam splitter 9 separates the forward radiation beam 20 from the reflected radiation beam 22 by transmitting at least part of the reflected radiation 22 towards to detection system 10. In the particular embodiment shown, the beam splitter 9 is a polarising beams splitter. A quarter waveplate 9' is positioned along the optical axis 19 between the beam splitter 9 and the objective lens system 8. The combination of the quarter waveplate 9' and the polarising beam splitter 9 ensures that the majority of the reflected radiation beam 22 is transmitted towards the detection system 10.

The detection system 10 includes a convergent lens 25 and a quadrant detector 23 which are arranged for capturing said part of the reflected radiation beam 22 and converting it to one or more electrical signals.

One of the signals is an information signal, the value of which represents the information scanned on the information layer 2. The information signal is processed by the information processing unit 14 for error correction.

Other signals from the detection system 10 are a focus error signal and a radial tracking error signal. The focus error signal represents the axial difference in height along the Z-axis between the scanning spot 16 and the position of the information layer 2. Preferably, this signal is formed by the "astigmatic method" which is known from, inter alia, the book by G. Bouwhuis, J. Braat, A. Huijiser et al, "Principles of Optical Disc Systems", pp. 75-80 (Adam Hilger 1985, ISBN 0-85274-785-3). The radial tracking error signal represents the distance in the XY-plane of the information layer 2 between the scanning spot 16 and the centre of track in the information layer 2 to be followed by the scanning spot 16. This signal can be formed from the "radial push-pull method" which is also known from the aforesaid book by G. Bouwhuis, pp. 70-73.

The servocircuit 11 is arranged for, in response to the focus and radial tracking error signals, providing servo control signals for controlling the focus actuator 12 and the radial actuator 13 respectively. The focus actuator 12 controls the position of the objective lens 8 along the Z-axis, thereby controlling the position of the scanning spot 16 such that it coincides substantially with the plane of the information layer 2. The radial actuator 13 controls the position of the objective lens 8 along the X-axis, thereby controlling the radial position of the scanning spot 16 such that it coincides substantially with the centre line of the track to be followed in the information layer 2.

The diffractive part 24 in this embodiment includes a birefringent material having an extraordinary refractive index $n_e$ and an ordinary refractive index $n_o$. In this embodiment, the diffractive part 24 is positioned between the radiation source 7 and the beam splitter 9, although in theory it could be positioned elsewhere along the optical axis 19.

The diffractive part includes birefringent material having an ordinary refractive index $n_o$ and an extraordinary refractive index $n_e$. The diffractive part is aligned such that the optic axis of the birefringent material is along the optical axis 19 (i.e. the Z-axis). It is also aligned such that its refractive index equals $n_e$ when traversed by a radiation beam having a polarisation along the X-axis and $n_o$ when traversed by a radiation beam having a polarisation along the Y-axis. In the following, the polarisation of a radiation beam is called "$p_e$" and "$p_o$" were aligned with the X-axis and the Y-axis, respectively. Thus, where the polarisation $p_1$, $p_2$, or $p_3$ equals $p_e$, the refractive index of the birefringent material equals $n_e$ and, where the polarisation $p_1$, $p_2$, or $p_3$ equals $p_o$, the refractive index of the birefringent material equals $n_o$. In other words, the birefringent diffractive part is so aligned as to be sensitive to the polarisations $p_1$, $p_2$, and $p_3$.

The diffractive part 24 is a diffractive part in accordance with an embodiment of the present invention. In this particular embodiment, the diffractive part is arranged to diffract the first radiation beam to form a three spot beam, to diffract the second radiation beam to form a different three spot beam, and to not substantially diffract the third radiation beam.

The objective lens 8 is arranged for transforming the collimated radiation beam 20 to the focus radiation beam 15, having a first numerical aperture $NA_1$, so as to form the scanning spot 16, and the two associated tracking spots (the optical path of a beam corresponding to one of the spots is indicated by a dotted line in FIG. 1). In other words, the optical scanning device 1 is capable of scanning the first information layer 2 by means of the radiation beam 15 having the wavelength $\lambda_1$, the polarisation $p_1$ and the numerical aperture $NA_1$ using a three spot beam.

Furthermore, although not shown, the optical scanning device is also capable of scanning a second information layer 2' of a second optical record carrier 3' by means of the radiation beam 4', and a third information layer 2" of a third optical record carrier 3" by means of the radiation beam 4". Thus, the objective lens system 8 transforms the collimated radiation beam 20' (in this instance a three spot beam i.e. comprising three beams) to a second focused radiation beam 15', having a second numerical aperture $NA_2$ so as to form a second scanning spot 16' in the position of the information layer 2' and also two additional associated tracking spots. The objective lens 8 also transforms the collimated radiation beam 20" (in this instance, a single beam) to a third focused radiation beam 15", having a third numerical aperture NA3 so as to form a third scanning spot 16" (with no associated tracking spots) in the position of the information layer 2".

Similarly to the optical record carrier 3, the optical record carrier 3' includes a second transparent layer 5' on one side of which the information layer 2' is arranged with the second information layer depth 27', and the optical record carrier 3" includes a third transparent layer 5" on one side of which the information layer 2" is arranged with the third information layer depth 27".

In this embodiment, the optical record carrier 3, 3' and 3" are, by way of example only, a "Blu-ray Disc"—format disc, a "Red-DVD"—format disc and a CD-format disc, respectively. Thus, the wavelength $\lambda_1$ is comprised in the range between 365 and 445 nm, and preferably, is 405 nm. The numerical aperture $NA_1$ equals about 0.85 in both the reading mode and the writing mode. The wavelength $\lambda_2$ is comprised in the range between 620 and 700 nm, and preferably, is 650 nm. The numerical aperture $NA_2$ equals about 0.6 in the reading mode and is above 0.6, preferably 0.65, in the writing mode. The wavelength $\lambda_3$ is comprised in the range between 740 and 820 nm and, preferably is about 785 nm. The numerical aperture $NA_3$ is below 0.5, preferably 0.45.

In the embodiments shown, the objective lens system 8 is shown as a single convex-lens. However, it will be appreciated that other lens element types such as plano-convex or convex-concave lenses can be used. The objective lens system 8 can be formed as a single lens, or as a compound lens. If desired, the diffractive part 24 could be formed as a separate element, or could be formed as part of another optical component e.g. it could be incorporated as a surface on a lens.

A design of an example diffractive part 24, suitable for use in the optical scanning device 1 shown in FIG. 1, will now be described.

The diffractive part 24 comprises a first diffractive grating structure and a second diffractive grating structure.

The diffractive part is arranged for use in conjunction with a Blu-ray Disc format, a DVD+RW (DVD Read Write) format and a CD format. The diffractive part is arranged to act as a three spot grating for Blu-ray Disc, a three spot grating for DVD+RW and as a single spot grating for the CD format.

When a radiation beam having a wavelength $\lambda$ traverses a step made of a material having a step height h, a phase change $\phi$ (with respect to the case where the radiation beam traverses through the air along the same distance) is introduced in the diffractive beam emerging from the step. The phase change $\phi$ is indicated by the following equation:

$$\varphi = 2\pi \frac{h(n_2 - n_1)}{\lambda} \qquad [1]$$

where "$n_2$" is the refractive index of the diffractive part and "$n_1$" is the refractive index of the adjacent medium. It follows from equation 1 that, when the wavelength λ changes, the phase change ϕ changes accordingly. It should also be noted that the refractive index of a material can vary as a function of wavelength.

Taking these constraints in mind, the first diffractive grating structure of the diffractive part shall now be designed such that it selects three diffraction orders for Blu-ray Disc and only the zeroth order diffraction for DVD+RW and CD. The diffractive grating structure will be of the binary type. The grating of this grating structure is made of birefringent material.

The polarisation of the DVD radiation beam is chosen such that the ordinary refractive index ($n_o$) of the birefringent material is selected, and the polarisations for both the Blu-ray Disc and CD beams are chosen such that the extraordinary refractive index ($n_e$) of the birefringent material is selected. In this particular example, the refractive index $n_{BD}$=1.61 ($n_e$) at λ=405 nm, and for DVD+RW the refractive index $n_{DVD}$=1.5 ($n_o$) at λ=650 nm, and for CD $n_{CD}$=1.603 ($n_e$) at λ=785 nm is selected.

The zones of the binary grating are chosen to consist of steps which are integers of the height $h_{DVD}$=$h_{CD}$, with $h_{DVD}$ and $h_{CD}$ given by $$h_{DVD} = \frac{\lambda_{DVD}}{n_{DVD} - 1} = 1.30 \, \mu m \quad [2]$$

$$h_{CD} = \frac{\lambda_{CD}}{n_{CD} - 1} = 1.30 \, \mu m \quad [3]$$

The refractive index of air is assumed to be 1. It will be appreciated from comparison of equations 2 and 3 with equation 1, that each step will thus give rise to a multiple of 2π phase for the CD and DVD configuration. Hence the structure has no effect on the radiation beams for the CD and DVD configuration, and all the light in the beams travels through the first diffractive grating structure with zeroth-order diffraction.

For later use, the height $h_{BD}$ is defined by $$h_{BD} = \frac{\lambda_{BD}}{n_{BD} - 1} = 0.664 \, \mu m \quad [4]$$

This height gives rise to a phase 2π of the beam of the Blu-ray Disc configuration.

Table 1 shows the phase divided by 2π modulo 1 of the Blu-ray Disc beam due to step heights that are multiples of $h_{DVD}$, where m is the multiple of $h_{DVD}$.

TABLE 1

| m | Phase/2π modulo 1 due to multiples of hDVD in the BD configuration |
|---|---|
| 1 | 0.9578 |
| 2 | 0.9157 |
| 3 | 0.8735 |
| 4 | 0.8313 |
| 5 | 0.7892 |
| 6 | 0.7470 |
| 7 | 0.7048 |

Figure 2:
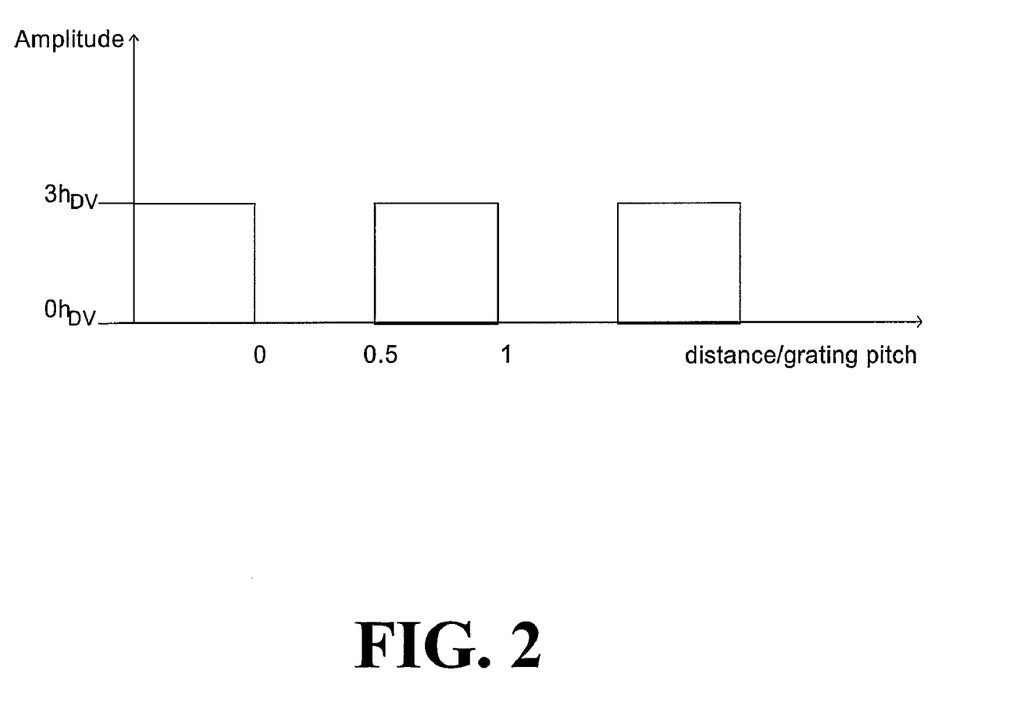
FIG. 2 shows the amplitude of the grating as a function of the distance across the grating for the first diffractive grating structure.

The first diffractive grating structure is arranged to generate a beam comprising three spots, with the power distribution between these spots being 1:15:1. To achieve this, the first diffractive grating structure requires a grating having a phase depth of 0.12*2π with 2 steps of equal width per period. This can be approximated with the step height $3*h_{dvd}$=3*1.3 μm=3.9 μm which gives a phase depth ϕ=(1−0.8735)*2π=0.1265*2π for the grating formed by the first diffractive grating structure. FIG. 2 illustrates the grating profile i.e. the grating amplitude as a function of distance. Such a step height results in a power distribution of 1:14:1 for the Blu-ray Disc beam. The calculation of the grating pitch will be described later.

The second diffractive grating structure is arranged to be a three spot grating for the DVD+RW beam, but have no effect on the Blu-ray Disc and CD radiation beams. This second diffractive grating structure is formed of a non birefringent material, having refractive index $n_{BD}$=1.516 at λ=405 nm, $n_{DVD}$=1.506 at λ=650 nm and $n_{CD}$=1.500 at λ=785 nm. As per equations 2,3 and 4 in relation to the first refractive grating, the various step heights that give rise to a 2π phase step in each mode are:

$$h_{BD} = \frac{\lambda_{BD}}{n_{BD} - 1} = 0.785 \, \mu m \quad [6]$$

$$h_{DVD} = \frac{\lambda_{DVD}}{n_{DVD} - 1} = 1.285 \, \mu m \quad [7]$$

$$h_{CD} = \frac{\lambda_{CD}}{n_{CD} - 1} = 1.570 \, \mu m \quad [8]$$

It should be noted that 2 $h_{BD}$=$h_{CD}$. Hence, this second diffractive grating structure takes $h_{CD}$ as the step height, such that the grating is invisible for Blu-ray Disc and CD radiation beams.

Table 2 shows the resulting phase/2π modulo 1 of the DVD radiation beam, as a function of step heights that are multiples (m) of $h_{CD}$.

TABLE 2

| m | Phase/2π modulo 1 due to multiples of hCD in the DVD configuration |
|---|---|
| 1 | 0.2218 |
| 2 | 0.4436 |
| 3 | 0.6654 |
| 4 | 0.8872 |
| 5 | 0.1089 |
| 6 | 0.3307 |
| 7 | 0.5525 |

The second diffractive grating structure is a three spot grating i.e. it is arranged to diffract the DVD radiation beam into three beams i.e. a three spot beam. Preferably, these beams have a power distribution close to 1:15:1 as well. As previously, the grating of the second diffractive grating structure should have a phase depth of 0.2*2π and 2 steps with equal widths per period. This can be approximated with step height $$4*h_{cd}=4*1.570 \, \mu m=6.280 \, \mu m \quad [9]$$

which gives a phase depth ϕ=(1−0.8872)*2π=0.1128*2π for the second diffractive grating structure, resulting in a power distribution of 1:18:1 for the DVD radiation beam.

Figure 3:
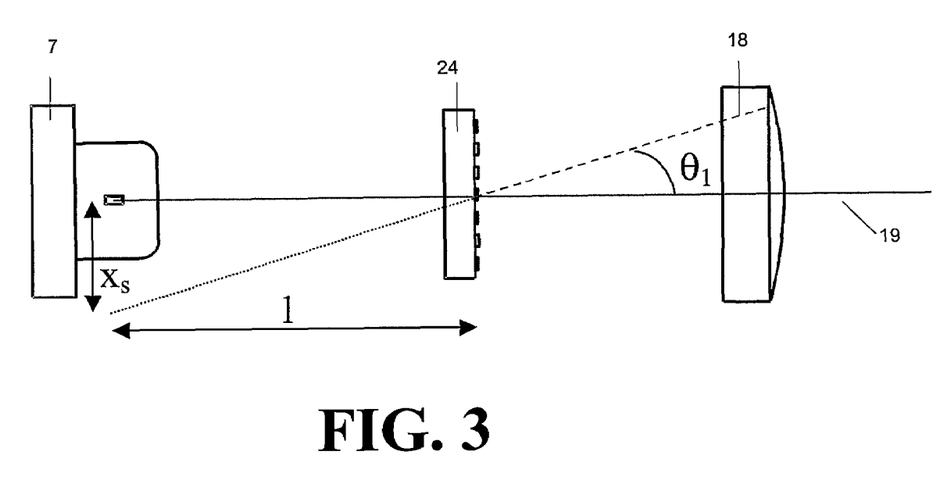
FIG. 3 is a schematic diagram including several of the components from the optical scanning device shown in FIG. 1, illustrating how the deflection angle of the first order of the grating can be determined.
Figure 4:
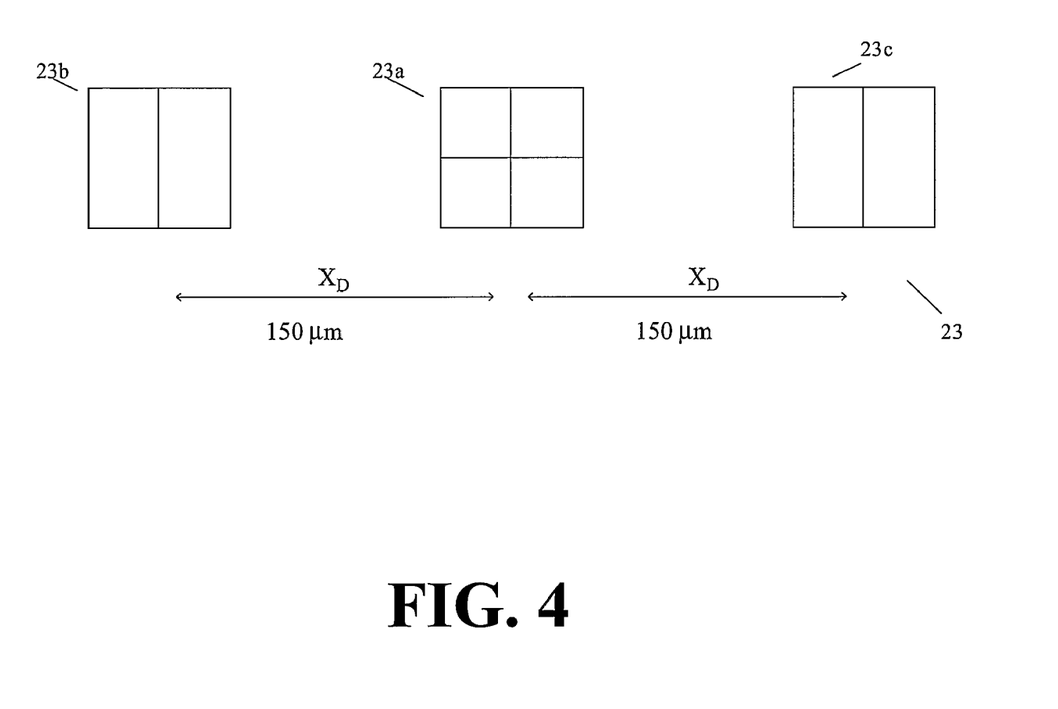
FIG. 4 is a plan view of a detector showing the central beam detector positioned relative to the adjacent spot detectors.

It is assumed that the focal length of the collimator, and the BD/DVD+RW compatible objective lens are 15 and 1.76 mm, respectively. The pupil diameter is 3.0 mm for BD and 2.3 mm for DVD+RW. In this example, the grating is assumed to be placed at a distance 1 of 5 mm from the lasers (1=5 mm as shown in FIG. 3). The grating pitch can be calculated as follows. The effect of the grating (see FIG. 3) is that a ray travelling along the optical axis 19 becomes deflected by an angle θ1. The system shown in FIG. 3 is therefore equivalent to a system without a grating but with the light source displaced by a distance $x_s$ with respect to the optical axis 19. In the case that servo lens 25 in FIG. 1 has no optical power, the virtual shift $x_s$ of the light source due to the grating 24 will result in the same shift $x_s$ of the detector, because on the return path the beam does not pass through the grating again. If $x_D$ is the pitch of the detector then the grating pitch p should be such that $x_s=x_D$ and hence can be calculated with $$p = \frac{\lambda l}{x_D} \qquad [10]$$

where $x_D$ is the pitch of the array of detectors arranged on the quadrant detector 23. In the present example, it is assumed that the array of detector elements within detector 23 have a pitch of 150 μm. FIG. 4 illustrates such a detector 23, where 23a is the central beam detector, with adjacent spot detectors 23b, 23c each a distance $x_D$ from detector 23a.

Using this equation 10, it can be calculated that at λ=405 nm the pitch of the first diffractive grating structure (the three spot Blu-ray Disc grating) is 13.5 μm. By way of contrast, at λ=650 nm, the pitch of the second diffractive grating structure (the DVD+RW grating) is 21.7 μm.

In other words, to allow the use of a single detector, it is desirable that the gratings forming the diffractive structures both have a different pitch and a different depth. In addition, it is desirable that the orientation of both diffractive grating structures along the optical axis 19 is different. In particular, the angle of the grating with respect to the Y-axis of the optical device follows from the track pitch and optical magnification. The track pitch is the pitch of the track on the optical record carrier. The track pitch for DVD+RW is 0.74 μm, and for Blu-ray Disc is 0.32 μm. The optical magnification can be determined by dividing the focal length of the collimator by the focal length of the respective objective lens. Thus, the magnification for DVD+RW is M=15/1.76=8.523, and for Blu-ray Disc is M=15/1.76=8.523.

It will be recalled that the pitch of the detector 23 is 150 μm. Thus, the distance between each spot (in the three spot radiation beam) as incident on the DVD+RW disc is $x_{DVD}$=150/8.523=17.6 μm. Thus, the angle of the grating form of the second diffractive grating structure is $\theta_{DVD}$=0.74/2/17.6=21 mrad (i.e. half of the track pitch divided by the spot distance $x_{DVD}$). By contrast, in relation to the Blu-ray Disc, the spot distance on the optical disc is $x_{BD}$=150/8.523=17.6 μm. This gives the angle of the grating of the first diffractive grating structure as $\theta_{BD}$=0.32/2/17.6=9.1 mrad.

In summary, the first diffractive grating structure is formed of birefringent material having a pitch of 13.5 μm and a depth of 3.9 μm with an orientation of 9.1 mrads. By way of contrast, the second diffractive grating structure is formed of non-birefringent material, has a pitch of 21.7 μm, a depth of 6.28 μm and an orientation of 21 mrad (i.e. is 21 mrad away from the y-axis).

Figure 5:
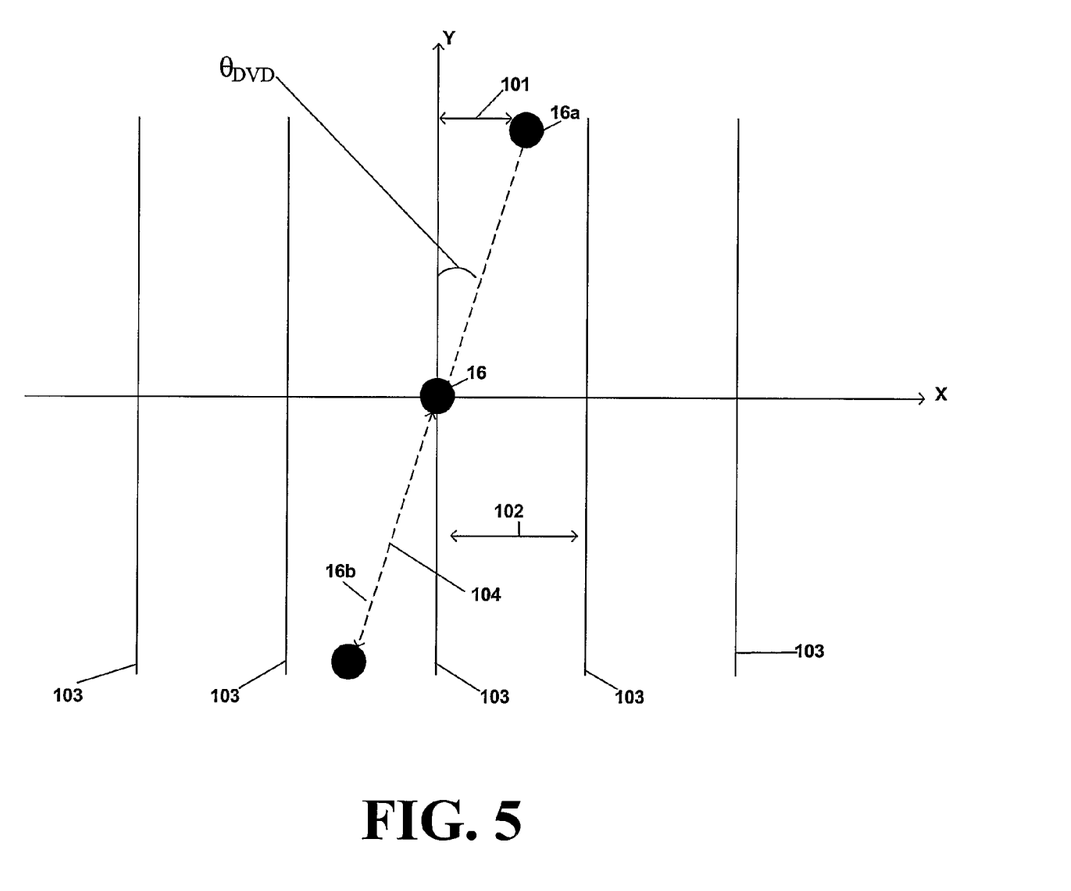
FIG. 5 is a plan view of an optical record carrier, illustrating the position of the three spots of a radiation beam relative to the tracks on the optical disc.

FIG. 5 illustrates a plan view of an information layer 27' for a DVD optical disc. The information layer 27' has tracks 103, which is scanned by spot 16. Side spots 16a,16b are used to provide position information (i.e. using a three-spot control system). The tracks 103 are separated by distance 102. Side spots 16a, 16b are located a distance 101, approximately one half of the track pitch from the track being scanned. The side spots 16a, 16b are located along a line extending at an angle $\theta_{DVD}$ relative to the Y-axis of the disc. The distance 104 between the central spot 16 and the side spot 16a, 16b is the detector pitch divided by the magnification.

The diffractive part formed by both the first and second diffractive grating structures can be made by placing two different gratings adjacent to one another. More preferably, the diffractive part is formed by adding both gratings on top of each other The resulting grating provided by the diffractive part acts as a three spots grating for Blu-ray Disc, a three spots grating for DVD+RW and as a single spot grating for CD.

Figure 6A:
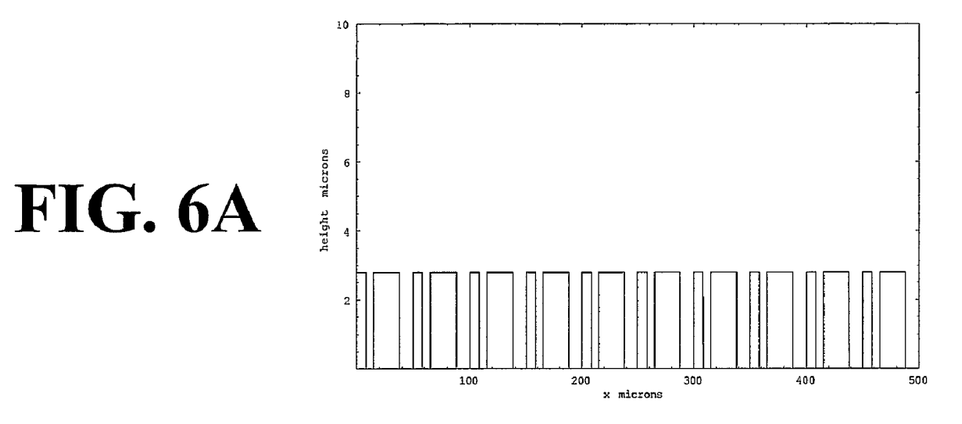
FIGS. 6A, B and C show respectively the height distributions of a seven spots grating for DVD with a pitch of 50 mm, for a three spots grating for CD with a pitch of 60 mm, and for a combined grating of the seven-spots DVD and the three-spots CD gratings.
Figure 6B:
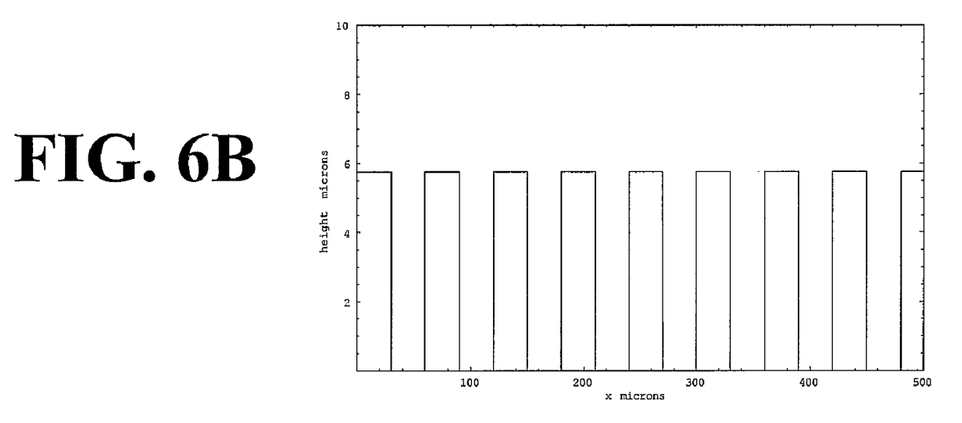
Figure 6C:
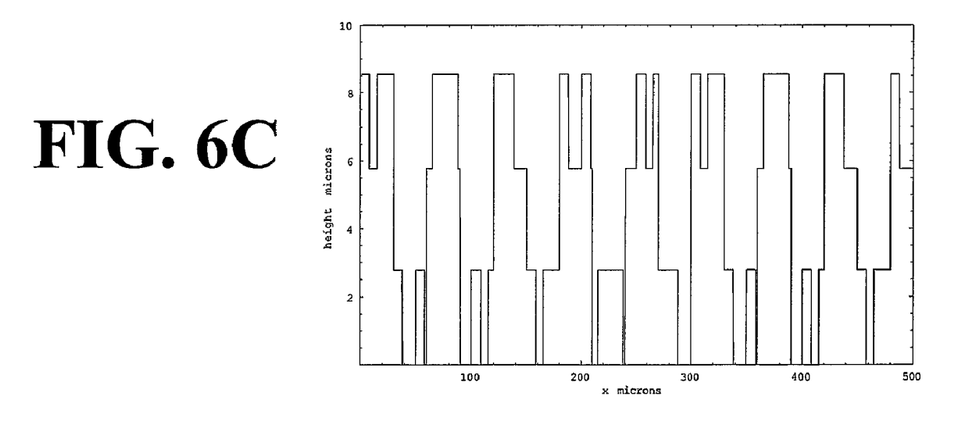

By way of illustrating how the gratings can be added on top each other, FIG. 6A illustrates the grating profile for a seven-spot DVD grating of pitch 50 μm, FIG. 6B illustrates the grating profile for a three-spot grating for CD with pitch 60 μm, and FIG. 6C illustrates the combined grating resulting from adding both gratings together.

Whilst the diffractive part can be formed by adding together the two diffractive grating structures, it will also be appreciated that the diffractive part can be formed by placing each diffractive grating structure in a separate plane. The planes of the diffractive grating structures can be parallel, or angled with respect to each other. For instance, one diffractive grating 'structure could be formed as steps on a first surface of an optical element, and the other diffractive grating structure could be formed on a second surface. The second surface can be at an angle relative to the first surface.

The above embodiments are provided by way of example only, and various modifications will be apparent to the skilled person. For instance, although the above embodiment has been described with reference to predetermined criteria (dependent upon the optical system in which the diffractive part is utilised), the skilled person will be able to modify the above specific embodiment for use in conjunction with optical systems having other criteria. Further, the skilled person will select the materials for the diffractive part in dependence on the desired performance (e.g. refractive index/indices) of the material. Various manufacturing methods will be known to the skilled person, as for instance disclosed within "Photo replication of birefringent phase structures" by E. Verstegen, B. Hendriks and M. van As in the technical digest of the International Symposium on Optical Memory 2003 (ISOM'03) page 110-111. A more extensive publication of this work can be found in Japanese Journal of Applied Physics Vol. 43 No. 7B.

By providing a diffractive part comprising two different diffractive grating structures, each grating structure providing a grating having steps of a carefully selected height, the diffractive part can be used as a grating selecting a different set of diffraction orders for more than two different wavelengths. Additionally, the use of two different diffractive grating structures within the diffractive part allows both the pitch and orientation of the grating structures to differ, as desired, for said at least two different wavelengths.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. An optical scanning device (1) for scanning a first information layer (2) by means of a first radiation beam (4) having a first wavelength ($\lambda_1$) and a first polarisation ($p_1$), a second information layer (2') by means of a second radiation beam having a second wavelength ($\lambda_2$) and a second polarisation ($p_2$), and a third information (2") layer by means of a third radiation beam (4") having a third wavelength ($\lambda_3$) and a third polarisation ($p_3$), wherein said first, second and third wavelengths ($\lambda_1$, $\lambda_2$, $\lambda_3$) differ from each other, the device comprising:

a radiation source (7a, 7b) for supplying said first, second and third radiation beams (4, 4', 4");

an objective lens system (8) for converging said radiation beams on the respective information layer; and a diffractive part (24) arranged in the optical path of said radiation beams (4, 4', 4"), the diffractive part comprising:

a first diffractive grating structure comprising a series of steps of predetermined height to introduce a phase change that is an integral multiple of $2\pi$ for both said second and third wavelengths ($\lambda_2$, $\lambda_3$,) but not for said first wavelength ($\lambda_1$); and a second diffractive grating structure comprising a series of steps of predetermined height to introduce a phase change that is an integral multiple of $2\pi$ for said first and third wavelengths ($\lambda_1$, $\lambda_3$) but not for said second wavelength ($\lambda_2$).

2. A device as claimed in claim 1, wherein the steps of said second diffractive grating structure have a different pitch from the steps of said first diffractive grating structure.

3. A device as claimed in claim 1, wherein said first diffractive grating structure is orientated at a first predetermined angle ($\theta_{BD}$) relative to an optical axis (19) of said objective lens system, and the second diffractive grating structure is orientated at a second, different predetermined angle ($\theta_{BD}$) relative to said optical axis (19).

4. A device as claimed claim 1, wherein said diffractive part comprises a superposition of the steps of said first and second diffractive grating structures.

5. A device as claimed in claim 1, wherein said first grating structure is arranged to diffract the first radiation beam to produce a three-spot beam of said first wavelength, and
said second diffractive grating structure is arranged to diffract said second wavelength so as to produce a three-spot beam of said second wavelength.

6. A device as claimed in claim 1, wherein said first diffractive grating structure is formed from a birefringent material.

7. A device as claimed in claim 1, wherein said second diffractive grating structure is formed from a non-birefringent material.

8. A device as claimed in claim 1, wherein at least one of said series of steps is a series of steps of equal width per period.

9. A device as claimed in claim 1, wherein at least one of said first, second and third polarisations ($p_1$, $p_2$, $p_3$) differs from the others.

10. A diffractive part (24) for use in an optical device (1) utilising a first radiation beam (4) having a first wavelength ($\lambda_1$) and a first polarisation ($p_1$), a second radiation beam (4') having a second wavelength ($\lambda_2$) and a second polarisation ($p_2$), and a third radiation beam (4") having a third wavelength ($\lambda_3$) and a third polarisation ($p_3$), wherein said first, second and third wavelengths ($\lambda_1$, $\lambda_2$, $\lambda_3$) differ from each other, the diffractive part (24) comprising:

a first diffractive grating structure comprising a series of steps of predetermined height to introduce a phase change that is an integral multiple of $2\pi$ for both said second and third wavelengths ($\lambda_2$, $\lambda_3$) but not for said first wavelength ($\lambda_1$); and a second diffractive grating structure comprising a series of steps of predetermined height to introduce a phase change that is an integral multiple of $2\pi$ for said first and third wavelengths ($\lambda_1$, $\lambda_3$) but not for said second wavelength ($\lambda_2$).

11. A diffractive part (24) as claimed in claim 10, wherein said first diffractive grating structure extends substantially in a first plane, said second diffractive grating structure extends substantially in a second plane, and said first plane is not parallel to said second plane.

12. A method of manufacturing an optical scanning device for scanning a first information layer (2) by means of a first radiation beam (4) having a first wavelength ($\lambda_1$) and a first polarisation ($p_1$), a second information layer (2') by means of a second radiation beam (4') having a second wavelength ($\lambda_2$) and a second polarisation ($p_2$), and a third information layer (2") by means of a third radiation beam (4") having a third wavelength ($\lambda_3$) and a third polarisation ($p_3$), wherein said first, second and third wavelength ($\lambda_1$, $\lambda_2$, $\lambda_3$) substantially differ from each other, the method comprising:

providing a radiation source (7a, 7b) for supplying said first, second and third radiation beams (4,4',4");

providing an objective lens system (8) for converging said radiation beams (4,4',4") on the respective information layer (2); and providing a diffractive part (24) arranged in the optical path of said radiation beams (4,4',4"), the diffractive part (24) comprising:

a first diffractive grating structure comprising a series of steps of predetermined height to introduce a phase change that is an integral multiple of $2\pi$ for both said second and third wavelengths ($\lambda_2$, $\lambda_3$) but not for said first wavelength ($\lambda_1$); and a second diffractive grating structure comprising a series of steps of predetermined height to introduce a phase change that is an integral multiple of $2\pi$ for said first and third wavelengths ($\lambda_1$, $\lambda_3$) but not for said second wavelength ($\lambda_2$).

13. A method of manufacturing a diffractive part (24) for use in an optical device (1) utilising a first radiation beam (4) having a first wavelength ($\lambda_1$) and a first polarisation ($p_1$), a second radiation beam (4') having a second wavelength ($\lambda_2$) and a second polarisation ($p_2$), and a third radiation beam (4") having a third wavelength ($\lambda_3$) a third polarisation ($p_3$), wherein said first, second and third wavelengths ($\lambda_1$, $\lambda_2$, $\lambda_3$) differ from each other, the method comprising:

providing a first diffractive grating structure comprising a series of steps of predetermined height to introduce a phase change that is an integral multiple of $2\pi$ for both said second and third wavelengths ($\lambda_2$, $\lambda_3$) but not for said first wavelength ($\lambda_1$); and providing a second diffractive grating structure comprising a series of steps of predetermined height to introduce a phase change that is an integral multiple of $2\pi$ for said first and third wavelengths ($\lambda_1$, $\lambda_3$) but not for said second wavelength ($\lambda_2$).

* * * * *